United States Patent
Kim et al.

(10) Patent No.: US 12,494,522 B2
(45) Date of Patent: Dec. 9, 2025

(54) METHOD FOR REUSING ACTIVE MATERIAL USING POSITIVE ELECTRODE SCRAP

(71) Applicant: LG ENERGY SOLUTION, LTD., Seoul (KR)

(72) Inventors: Min-Seo Kim, Daejeon (KR); Se-Ho Park, Daejeon (KR); Doo-Kyung Yang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 673 days.

(21) Appl. No.: 17/792,688

(22) PCT Filed: Jan. 14, 2021

(86) PCT No.: PCT/KR2021/000556
§ 371 (c)(1),
(2) Date: Jul. 13, 2022

(87) PCT Pub. No.: WO2021/246606
PCT Pub. Date: Dec. 9, 2021

(65) Prior Publication Data
US 2023/0051670 A1    Feb. 16, 2023

(30) Foreign Application Priority Data
Jun. 4, 2020 (KR) .......................... 10-2020-0067429

(51) Int. Cl.
| | | |
|---|---|---|
| H01M 10/54 | (2006.01) | |
| C01G 53/44 | (2025.01) | |
| H01M 4/505 | (2010.01) | |
| H01M 4/525 | (2010.01) | |
| H01M 4/02 | (2006.01) | |

(52) U.S. Cl.
CPC ............ *H01M 10/54* (2013.01); *C01G 53/44* (2013.01); *H01M 4/505* (2013.01); *H01M 4/525* (2013.01); *C01P 2002/50* (2013.01); *C01P 2004/03* (2013.01); *C01P 2004/80* (2013.01); *C01P 2006/40* (2013.01); *C01P 2006/80* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 8,616,475 B1 | 12/2013 | Smith et al. | |
| 2013/0323142 A1 | 12/2013 | Shimano et al. | |
| 2018/0212282 A1 | 7/2018 | Lee et al. | |
| 2019/0260100 A1 | 8/2019 | Sloop | |

FOREIGN PATENT DOCUMENTS

| | | | | |
|---|---|---|---|---|
| CN | 101847763 A | 9/2010 | | |
| CN | 103915661 A | * 7/2014 | ............... | C22B 7/00 |
| CN | 108172922 A | 6/2018 | | |
| JP | 2012-186150 A | 9/2012 | | |
| JP | 2017-117700 A | 6/2017 | | |
| JP | 2019-169308 A | 10/2019 | | |
| KR | 10-2005-0112487 A | 11/2005 | | |
| KR | 10-2011-0088356 A | 8/2011 | | |
| KR | 10-2016-0008040 A | 1/2016 | | |
| KR | 10-2017-0033787 A | 3/2017 | | |
| KR | 10-2017-0075124 A | 7/2017 | | |
| KR | 10-2018-0087615 A | 8/2018 | | |

OTHER PUBLICATIONS

Zhao et al, (2020) "Regeneration and Reutilization of Cathode Materials from Spent Lithium-Ion Batteries", Chemical Engineering Journal, vol. 383, 19 pages. (Available online Oct. 8, 2019).
Sieber et al. (2019): "Recovery of Li(Ni0.33Mn0.33Co0.33)02 from Lithium-Ion Battery Cathodes: Aspects of Degradation", Nanomaterials, vol. 9, No. 2, 14 pages.
Meng et al, (2018): "A Combined Process for Cobalt Recovering and Cathode Material Regeneration From Spent LiCoO2 batteries: Process Optimization and Kinetics Aspects", Waste Management, vol. 71, pp. 372-380 (Available online Nov. 6, 2017).

* cited by examiner

*Primary Examiner* — Tanisha Diggs
(74) *Attorney, Agent, or Firm* — Bryan Cave Leighton Paisner LLP (57) ABSTRACT

There is provided a method for collecting and reusing an active material from positive electrode scrap. The method of reusing a positive electrode active material of the present disclosure includes (a-1) immersing a positive electrode scrap comprising an active material layer on a current collector into a basic solution to separate the active material layer from the current collector, (a-2) thermally treating the active material layer in air for thermal decomposition of a binder and a conductive material in the active material layer, and collecting an active material in the active material layer, (b) washing the active material collected from the step (a-2) with a lithium compound solution which is basic in an aqueous solution and drying, and (c) annealing the active material washed from the step (b) with a lithium precursor to obtain a reusable active material.

18 Claims, 9 Drawing Sheets

METHOD FOR REUSING ACTIVE MATERIAL USING POSITIVE ELECTRODE SCRAP

CROSS-REFERENCE TO RELATED APPLICATIONS

The present application is a National Phase entry pursuant to 35 U.S.C. § 371 of International Application No. PCT/KR2021/000556, filed on Jan. 14, 2021, and claims the benefit of and priority to Korean Patent Application No. 10-2020-0067429, filed on Jun. 4, 2020 with the Korean Intellectual Property Office, the disclosures of which are incorporated herein by reference in their entirety for all purposes as if fully set forth herein.

TECHNICAL FIELD

The present disclosure relates to a method for reusing resources in the fabrication of a lithium secondary battery. More particularly, the present disclosure relates to a method for collecting and reusing positive electrode scrap generated in the lithium secondary battery fabrication process or positive electrode active materials of lithium secondary batteries discarded after use.

BACKGROUND

Lithium secondary batteries that can be recharged repeatedly are gaining attention as an alternative to fossil energy. They have been primarily used in traditional handheld devices such as mobile phones, video cameras and electric power tools. Recently, the range of applications tends to gradually extend to vehicles which are powered by electricity (EVs, HEVs, PHEVs), large-capacity energy storage systems (ESSs) and uninterruptible power systems (UPSs).

A lithium secondary battery includes an electrode assembly including unit cells, each unit cell including a positive electrode plate and a negative electrode plate including a current collector and an active material coated on the current collector with a separator interposed between the positive electrode plate and the negative electrode plate, and a packaging or a battery case in which the electrode assembly is hermetically received together with an electrolyte solution. The lithium secondary battery primarily includes lithium-based oxide as the positive electrode active material and a carbon-based material as the negative electrode active material. The lithium-based oxide contains a metal such as cobalt, nickel or manganese. In particular, cobalt, nickel and manganese are very expensive invaluable metals. Among them, cobalt is a strategic metal, and its supply is the focus of attention all over the world. Due to the limited number of cobalt producing countries, the global supply of cobalt is unstable. When a supply and demand imbalance of strategic metal occurs, there is a very high possibility that the cost of the raw material will rise.

Studies have been made to collect and recycle invaluable metals from lithium secondary batteries (waste batteries) discarded after the expiration date. In addition to waste batteries, resources may be more preferably collected from waste materials discarded after punching the positive electrode plate or the positive electrode in which defects or failures occurred during the process.

Figure 1:
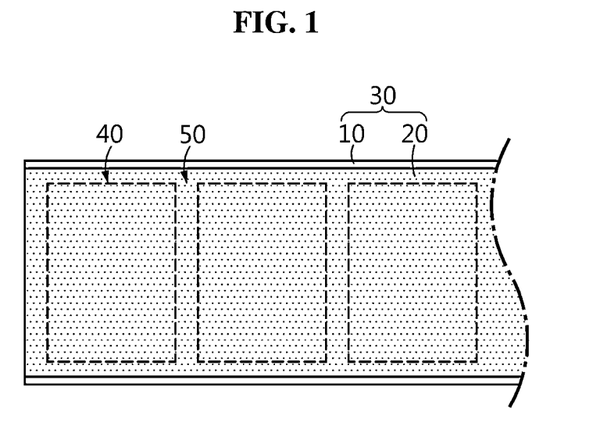
FIG. 1 is a diagram showing positive electrode scrap discarded after punching a positive electrode plate in a positive electrode sheet.

Currently, the lithium secondary battery is fabricated, as shown in FIG. 1, by coating a positive electrode slurry including a positive electrode active material, a conductive material, a binder and a solvent on a long sheet-type positive electrode current collector 10 such as an aluminum (Al) foil to form a positive electrode active material layer 20, manufacturing a positive electrode sheet 30, and punching a positive electrode plate 40 to a predetermined size. The leftover after punching is discarded as positive electrode scrap 50. If the positive electrode active material is collected and reused from the positive electrode scrap 50, it will be very desirable in the industrial-economic and environmental aspects.

Most of the existing methods of collecting the positive electrode active material include dissolving the positive electrode with hydrochloric acid, sulfuric acid, nitric acid or the like, extracting the active material elements such as cobalt, nickel and manganese and using them as raw materials for the positive electrode active material synthesis. However, the active material element extraction using acids uses a non-eco-friendly process to collect pure raw materials, and needs a neutralization process and a waste water treatment process, resulting in the increased process cost. Additionally, it is impossible to collect lithium, one of the key positive electrode active material elements. To overcome these disadvantages, there is a need for a direct reuse method that does not dissolve the positive electrode active material and does not extract the active material in the form of an element.

In addition, since some of the electrolyte solutions remain on the positive electrode scrap obtained from positive electrodes damaged during the process, batteries determined as defective or failed in the quality test or waste batteries discarded after the expiration date, there is a need for a method for collecting the active material by safely treating the electrolyte solution.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

The present disclosure is directed to providing a method for collecting and reusing active materials from positive electrode scrap.

Technical Solution

To achieve the above-described problem, a method for reusing a positive electrode active material of the present disclosure includes (a-1) immersing a positive electrode scrap comprising an active material layer on a current collector into a basic solution to separate the active material layer from the current collector, (a-2) thermally treating the active material layer in air for thermal decomposition of a binder and a conductive material in the active material layer, and collecting an active material in the active material layer, (b) washing the active material collected from the step (a-2) with a lithium compound solution which is basic in an aqueous solution and drying, and (c) annealing the active material washed from the step (b) with a lithium precursor to obtain a reusable active material.

In the present disclosure, the basic solution preferably includes LiOH or NaOH.

In the present disclosure, the positive electrode active material reuse method may further include (d) surface-coating the active material annealed from the step (c).

The thermal treatment in the step (a-2) may be performed at 300 to 800° C.

The thermal treatment in the step (a-2) may be performed at 550° C. for 30 min at the temperature rise rate of 5° C./min.

The lithium compound solution contains a lithium compound, preferably LiOH, in an amount of more than 0% and 15% or less. The washing may be performed within 1 hour.

The washing in the step (b) may be performed by stirring the active material collected from the step (a-2) at the same time with immersing into the lithium compound solution.

The lithium precursor may be one or more selected from the group consisting of LiOH, $Li_2CO_3$, $LiNO_3$ and $Li_2O$.

The lithium precursor may be added in an amount for adding lithium at a ratio of lost lithium to a ratio of lithium and other metal in a raw active material used in the active material layer.

For example, the lithium precursor may be included in the lithium precursor solution in an amount corresponding to an amount of lithium at a molar ratio of 0.001 to 0.4 relative to an amount of lithium in the active material layer.

Further, an additional lithium precursor may be further included in the lithium precursor solution in an amount corresponding to an amount of lithium at a molar ratio of 0.0001 to 0.1 relative to an amount of lithium in the active material layer.

The annealing may be performed in air at 400 to 1000° C.

A temperature of the annealing step may exceed a melting point of the lithium precursor.

The active material in the active material layer may be collected in a form of powder, and carbon produced by carbonization of the binder or the conductive material may not remain on a surface of the powder.

The surface-coating step (d) may include coating at least one of a metal, an organic metal or a carbon material on a surface of the active material annealed from the step (c) by a solid or liquid phase process, and thermally treating at 100 to 1200° C.

The reusable active material may be represented by the following Formula 1:

$Li_aNi_xMn_yCo_zM_wO_{2+\delta}$ [Formula 1]

where M includes at least one selected from the group consisting of B, W, Al, Ti and Mg, $1<a\leq1.1$, $0\leq x<0.95$, $0\leq y<0.8$, $0\leq z<1.0$, $0\leq w\leq0.1$, $-0.02\leq\delta\leq0.02$, $x+y+z+w=1$.

The reusable active material may have a fluorine (F) content of 150 ppm or less.

The positive electrode scrap comprises a residual electrolyte solution, and the residual electrolyte solution may be removed in the step (a-1), and the step (a-1) may further include filtration and washing after the immersion.

Advantageous Effects

According to the present disclosure, it is possible to reuse waste positive electrode active materials such as positive electrode scrap generated in the lithium secondary battery fabrication process without using acids, thereby achieving eco-friendliness. The method according to the present disclosure does not need a neutralization process or a waste water treatment process, thereby achieving environmental mitigation and process cost reduction.

According to the present disclosure, it is possible to collect all the metal elements of the positive electrode active materials. This method does not use the extracted active material elements as raw materials for positive electrode active material synthesis, and instead directly reuses the active materials collected in the form of powder, thereby achieving economical efficiency.

According to the present disclosure, toxic and explosive solvents such as NMP, DMC, acetone and methanol are not used, thereby achieving safety, and since simple processes such as thermal treatment, washing and annealing are used, it is easy to manage the process and suitable for mass production.

According to the present disclosure, since the residual electrolyte solution on positive electrode scrap from waste batteries is removed in the step using the basic solution, the subsequent thermal treatment process is safely performed and the presence of impurities such as metal compounds caused by the residual electrolyte solution is prevented, and since expensive organic solvents are not used, there is a cost advantage.

According to the present disclosure, it is possible to ensure excellent resistance characteristics and capacity characteristics without electrochemical performance degradation of the collected active materials.

BRIEF DESCRIPTION OF THE DRAWINGS

The accompanying drawings illustrate the embodiments of the present disclosure, and together with the following detailed description, serve to provide a further understanding of the technical aspects of the present disclosure, and thus the present disclosure should not be construed as being limited to the drawings.

DETAILED DESCRIPTION

Hereinafter, the embodiments of the present disclosure will be described with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations in the drawings are just an example, and do not fully describe the technical aspect of the present disclosure, so it should be understood that a variety of other equivalents and modifications could have been made thereto at the time of filing the patent application.

In the following description, a reference is made to the accompanying drawings that make up some of the present disclosure. The embodiments described in the detailed description, the drawings and the appended claims are not intended to be limiting. Other embodiments may be used without departing from the technical aspect and scope of the subject matter disclosed herein, and modifications and changes may be made thereto. As commonly described herein and illustrated in the drawings, the aspects of the present disclosure may include arrangement, substitution, combination, separation and design of a variety of different elements, and it will be immediately understood that all of them are clearly taken into account.

Unless otherwise defined, all terms (including technical and scientific terms) used herein have the same meaning as commonly understood by those having ordinary skill in the technical field pertaining to the present disclosure (hereinafter those skilled in the art). The present disclosure is not limited to specific embodiments described herein.

As obvious to those skilled in the art, many modifications and changes may be made thereto without departing from the technical aspects and scope of the present disclosure. In addition to those enumerated herein, functionally equivalent methods in the scope of the present disclosure will be obvious to those skilled in the art from the previous descriptions. Such modifications and changes fall in the scope of the appended claims. The present disclosure will be defined by the appended claims along with the scope of all equivalents to which the appended claims are entitled. It should be understood that the present disclosure is not limited to specific variant methods. It should be further understood that the terms used herein are for the purpose of describing the specific embodiments, but not intended to limit the present disclosure.

The conventional active material reuse process is mainly aimed at extracting the elements of invaluable metals (nickel, cobalt, manganese) in active materials of lithium secondary batteries of which the performance degraded after use and re-synthesizing the active materials, and as opposed to the conventional process, the present disclosure is characterized as collecting active materials from positive electrode scrap generated in the lithium secondary battery fabrication process.

In addition, the well-known active material reuse process involves producing metals (direct reduction method) or resynthesized active materials from invaluable metals extracted through acid/base dissolution or melting using reduction agents/additives, which requires an additional chemical method, making the process complex and causing additional economical expenses. However, the present disclosure relates to a method for reusing positive electrode active materials directly without dissolving the positive electrode active materials.

To directly reuse the positive electrode active materials, it is necessary to remove the current collector from the positive electrode. The current collector may be removed from the positive electrode by removing the binder through high temperature thermal treatment, melting the binder using the solvent, melting the current collector, and screening the active materials through dry milling and sieving.

When melting the binder using the solvent, the stability of the solvent is important. NMP is the most efficient solvent, but its disadvantage is toxicity and high cost. Another disadvantage is that a waste solvent re-treatment or solvent collection process is necessary. Melting the current collector requires a lower process cost than using the solvent. However, it is difficult to remove impurities from the reusable active material surface, and hydrogen gas is produced in the current collector removal process, causing an explosion risk. Dry milling and sieving cannot perfectly separate the current collector and the active material. The particle size distribution of the active materials changes in the milling process and it is difficult to remove the binder, resulting in characteristics degradation of batteries including the reusable active materials.

The present disclosure first separates the active material layer and the current collector using a basic solution, and removes the binder in the active material layer using high temperature thermal treatment. In particular, since the basic solution is first used, the problem arising from the residual electrolyte solution is solved, and thermal treatment is performed in air, so the process only requires heating without any special device configuration and thus is relatively simple, and it is suitable for mass production and commercialization. Impurities should not remain on the reusable active material surface. The present disclosure proposes removing impurities from the reusable active material surface.

Figure 2:
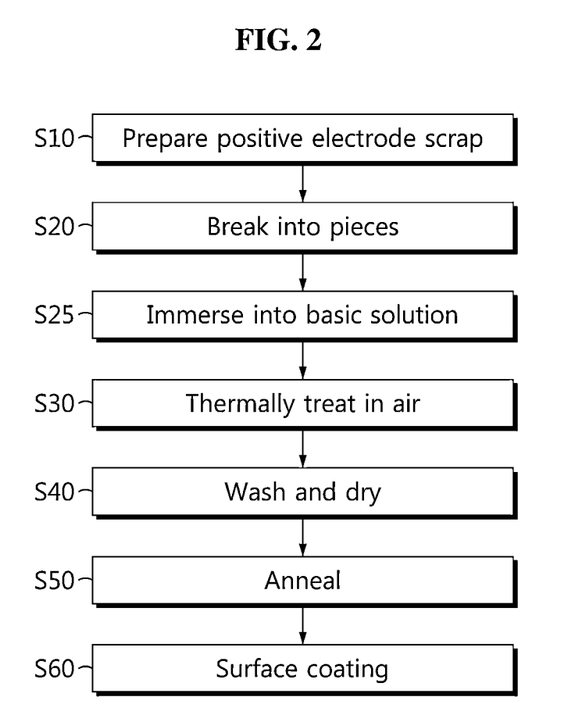
FIG. 2 is a flowchart of an active material reuse method according to the present disclosure.

Hereinafter, the active material reuse method according to an embodiment of the present disclosure will be described with reference to FIG. 2. FIG. 2 is a flowchart of the active material reuse method according to the present disclosure.

Referring to FIG. 2, first, waste positive electrode scrap is prepared (S10).

As described above with reference to FIG. 1, positive electrode scrap may be leftover after manufacturing a positive electrode sheet including a lithium composite transition metal oxide positive electrode active material layer on a current collector and punching the positive electrode sheet. In addition, positive electrode scrap may be prepared by collecting positive electrodes in which defects or failures occurred during the process. Additionally, positive electrode scrap may be prepared by separating positive electrodes from lithium secondary batteries discarded after use.

For example, degraded positive electrode scrap may be prepared or positive electrode scrap may be prepared from a positive electrode damaged in the secondary battery fabrication process including coating a slurry on a sheet type current collector of an aluminum foil, the slurry prepared by adding N-methyl pyrrolidone (NMP) to lithium cobalt oxide such as $LiCoO_2$(LCO) as an active material, or NCM-based active material comprising nickel, cobalt and manganese, carbon such as carbon black as a conductive material and polyvinylidene fluoride (PVdF) as a binder and mixing, then drying in a vacuum oven of about 120° C. to manufacture a positive electrode sheet, punching a positive electrode plate into a predetermined size, assembling the positive electrode plate with a negative electrode plate, and injecting an electrolyte solution.

The positive electrode scrap has the active material layer on the current collector of a metal foil such as the aluminum foil. In case that there is the residual electrolyte solution on the degraded positive electrode scrap, it is necessary to safely remove the electrolyte solution.

Subsequently, the positive electrode scrap is broken into pieces to a proper size (S20). Breaking into pieces refers to cutting or shredding of the positive electrode scrap to a proper size for handling. After the cutting or shredding, the size of the positive electrode scrap is reduced to, for example, 1 cm×1 cm. A variety of dry milling equipment including a hand-mill, a pin-mill, a disk-mill, a cutting-mill and a hammer-mill, and a high speed cutter may be used to break into pieces.

The cutting or shredding may be performed considering the handling of the positive electrode scrap and the characteristics required in equipment used in the subsequent processes. For example, when equipment requiring continuous treatment in the loading and unloading of the positive electrode scrap is used, it is necessary to break too large positive electrode scrap into pieces to facilitate the movement of the positive electrode scrap.

Subsequently, the positive electrode scrap is immersed into a basic solution (S25). During the immersion, mechanical forces may be applied by, for example, ultrasonic treatment, stirring using a magnetic stirrer or crushing through a suitable tool. The concentration of the basic solution ranges between pH7 and pH14, preferably between pH10 and pH14, and more preferably between pH12 and pH14. Preferably, the basic solution includes LiOH or NaOH. The basic solution may include KOH or NaCl. In addition to the enumerated materials, the basic solution may include chemical materials that are washed out with water or polar materials by ionization.

When the positive electrode scrap is put in the basic solution, the current collector dissolves. In this instance, external mechanical forces may be applied by, for example, stirring, to separate the active material layer from the current collector more easily and remove the residual electrolyte solution on the active material layer. When the current collector is completely dissolved in the basic solution, or when the active material layer is separated, the current collector floats on the basic solution due to a specific gravity difference, and thus only the active material layer may be collected through filtration after the immersion. In this instance, the active material layer may lose continuity featuring a layer and may be broken into pieces, but since the active material, the binder and the conductive material are still agglomerated in the active material layer, the active material layer is in the form of flakes and also in this case, the specification will indicate the active material layer.

The current collector may be completely dissolved in the basic solution and washed with water to remove, or when the separated current collector floats on the basic solution due to a specific gravity difference, the float may be separated and removed using a net. After filtering the active material flakes with a decompression filter, washing may be further performed to completely remove the electrolyte solution and Na in the basic solution.

Figure 3:
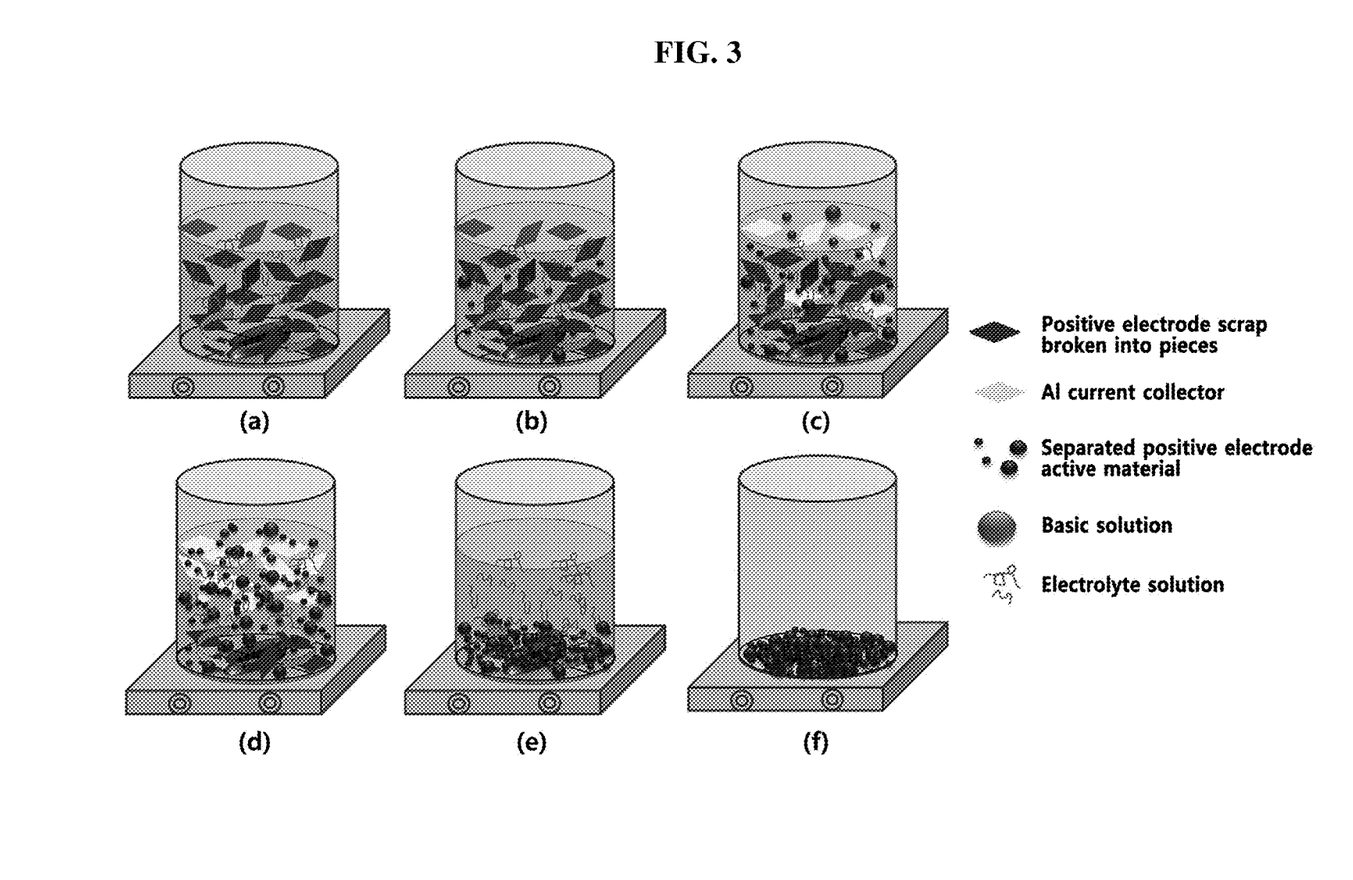
FIG. 3 is a diagram showing a series of steps related to a process of immersing into a basic solution in FIG. 2.

FIG. 3 is a diagram showing a series of steps related to the process of S25 of immersion into the basic solution. (a) shows that the positive electrode scrap broken into pieces are immersed and stirred in the basic solution, (b) shows that stirring is further performed, (c) shows that in some positive electrode scrap, eventually the active material layer is separated from the aluminum (Al) current collector, (d) shows that the current collector is completely dissolved or separated from the active material layer after the immersion and stirring, (e) shows that the active material layer sinks due to the specific gravity difference, and (f) shows the active material layer having experienced washing and drying as the additional step. As shown in (f), the current collector and the electrolyte solution are removed through this step and only the flake type active material layer is left.

Subsequently, referring to FIG. 2, the active material layer separated in S25 is thermally treated in air (S30). The active material layer is formed by coating the slurry including a mixture of the active material, the conductive material, the binder and the solvent, and after solvent volatilization, the active material and the conductive material are bonded by the binder. The active material layer is separated from the current collector through S25, but since the active material and the conductive material are bonded through the binder, it is necessary to remove the binder to separate the active material.

In the present disclosure, thermal treatment is performed for thermal decomposition of the binder in the active material layer. The thermal treatment may be performed at 300 to 800° C., and may be referred to as high temperature thermal treatment. At temperatures of less than 300° C., it may be difficult to remove the binder and higher temperatures than 800° C. are unnecessary. In case that thermal treatment is performed in the presence of the current collector, it is necessary to perform the thermal treatment below the melting point of the current collector, but since the current collector is already separated according to the present disclosure, the thermal treatment temperature is not restricted by the current collector.

The thermal treatment time is long enough for thermal decomposition of the binder. For example, the thermal treatment time is about 30 min. Preferably, the thermal treatment time is 30 min or longer. As the thermal treatment time increases, the thermal decomposition of the binder is prolonged, but when the thermal treatment time is equal to or longer than a predetermined time, there is no difference in thermal decomposition effect. Preferably, the thermal treatment time is 30 min or longer and 5 hours or shorter.

The thermal treatment equipment may include various types of furnaces. For example, the thermal treatment equipment may be a box type furnace, and when considering productivity, may be a rotary kiln capable of continuous treatment.

The thermal treatment may be followed by fast or slow cooling in air.

For example, the thermal treatment may be performed at 550° C. for 30 min at the temperature rise rate of 5° C./min. For example, the temperature rise rate is within the allowable range of the box type furnace and is enough to heat the positive electrode scrap without thermal shock. When the thermal treatment is performed at the above-described temperature for less than 10 min, thermal decomposition is insufficient, and thus it is necessary to perform the thermal treatment for 10 min or longer, and preferably for 30 min or longer.

$CO_2$ and $H_2O$ produced by the thermal decomposition of the binder and the conductive material in the active material layer through the thermal treatment in air are removed. Since the binder is removed, the active material to collect may be screened in the form of powder. Accordingly, the active material in the active material layer may be collected by performing S30.

It is important to perform the thermal treatment of S30 in air. When the thermal treatment is performed in a reducing or inert gas atmosphere, the binder and the conductive material suffer carbonization rather than thermal decomposition. When carbonized, carbon remains on the active material surface and degrades the performance of the reusable active materials. When the thermal treatment is performed in air, carbon in the binder or the conductive material is removed by combustion reaction with oxygen to produce $CO$, $CO_2$ gas, and thus the binder and the conductive material do not remain and are almost removed.

Accordingly, according to the present disclosure, the active material is collected in the form of powder, and carbon produced by the carbonization of the binder or the conductive material may not remain on the surface.

In the case of the residual electrolyte solution in positive electrode scrap, when S30 is performed without performing S25 of the proposed method, impurities such as metal compounds may be formed in a large amount when removing the electrolyte solution, the binder and the conductive material through thermal treatment. Additionally, when thermal treatment is performed in the presence of the electrolyte solution, the electrolyte solution may make it unstable to maintain the thermal treatment temperature. However, when the electrolyte solution is completely removed and the current collector is separated through S25 as proposed, it is possible to avoid lithium metal impurities that may be formed by the electrolyte solution.

Subsequently, the collected active material is washed and dried (S40). It is important to wash with a lithium compound solution which is basic in an aqueous solution. The lithium compound solution contains a lithium compound, preferably LiOH, in an amount of more than 0% and 15% or less. Preferably, the amount of LiOH is 15% or less. When LiOH is included in an excessive amount, excess LiOH may remain on the active material surface after washing, which may affect the subsequent annealing process. It is undesirable to add excess LiOH to make the active material surface before annealing as clean as possible, and the amount of LiOH is limited to 15% or less.

The washing may be performed by immersing the collected active material in the lithium compound solution. The washing may be performed within a week after immersion, preferably a day, and more preferably 1 hour. When washing is performed for a week or longer, the capacity may reduce due to excessive lithium dissolution. Accordingly, it is desirable to wash within 1 hour. The washing includes immersing the active material in the lithium compound solution which is basic in an aqueous solution, and stirring in the immersed state. It is desirable to perform immersion and stirring together. When the active material is immersed in the lithium compound solution without stirring, the washing process is slow, resulting in lithium dissolution. When stirring is performed together, the process time is minimized, and accordingly it is desirable to perform the stirring at the same time with the immersion in the lithium compound solution. The drying may be performed in air in an oven (convection type) after filtration.

The washing with the lithium compound solution which is basic in an aqueous solution is performed for removal of LiF and metal fluoride that may be present on the surface of the collected active material and surface modification. During the thermal treatment of S30, the binder and the conductive material in the active material layer are removed by evaporation of $CO_2$ and $H_2O$, and in this process, $CO_2$ and $H_2O$ react with lithium on the active material surface to produce $Li_2CO_3$, LiOH, and fluorine (F) present in the binder such as PVdF reacts with the metal element of the positive electrode active material to produce LiF or metal fluoride. When LiF or metal fluoride remains, the characteristics of batteries including the reusable active materials degrade. The present disclosure adds the washing step of S40, to remove reactants that may be generated on the reusable active material surface during the thermal treatment step (S30), in order to prevent impurities from remaining on the reusable active material surface.

In S40, it is important to wash with the lithium compound solution which is basic in an aqueous solution. When a sulfuric acid or hydrochloric acid aqueous solution is used instead of the lithium compound solution which is basic in an aqueous solution, F on the active material surface is washed out, but the performance of the reusable positive electrode active materials may degrade due to dissolution of transition metal (Co, Mg) present in the active material. The lithium compound solution which is basic in an aqueous solution used in the present disclosure plays a role in removing trace amounts of binder that may be left after the thermal decomposition of S30, does not dissolve the transition metal present in the active material, and compensates for the amount of lithium dissolved in the washing process.

Through S40, the present disclosure may adjust the LiF content on the collected active material surface to less than 500 ppm, thereby improving the capacity. Preferably, the F content may be 150 ppm or less. More preferably, the F content may be 30 ppm or less.

Subsequently, the washed active material is annealed with an addition of a lithium precursor (S50).

Losses of lithium in the active material may occur through the previous steps S30 and S40. S50 compensates for the lithium loss.

Besides, in S50, the crystal structure of the active material is recovered through annealing, so the characteristics of the reusable active material are recovered or improved to the level of unused fresh active material.

The transformation structure may be found in the active material surface through the previous steps S30 and S40. For example, NCM-based lithium composite transition metal oxide as the active material may have a spinel structure due to transformation of Ni into rock-salt [$NiCO_3 \cdot 2Ni(OH)_2$) $H_2O$] by the moisture in S40. When batteries are manufactured in this state, the battery characteristics may degrade such as capacity reduction. The present disclosure recovers the crystal structure through S50. For example, NCM-based lithium composite transition metal oxide as the active material is recovered to a hexagonal structure. Accordingly, it is possible to recover or improve the initial characteristics to the similar level to fresh active material.

Besides, in the case of LCO active material, $Co_3O_4$ may be produced by thermal decomposition on the surface. When batteries are manufactured without removing $Co_3O_4$, the battery characteristics may degrade. The present disclosure may recover or improve the initial characteristics to the similar level to fresh active material by recovering the crystal structure and removing $Co_3O_4$ through S50.

The lithium precursor in S50 may be at least one LiOH, $Li_2CO_3$, $LiNO_3$ or $Li_2O$.

The lithium precursor is added in an amount for adding lithium at a ratio of lithium loss to a ratio of lithium and other metal in the raw active material (i.e., fresh active material) used in the active material layer. For example, when the ratio of lithium and other metal in the fresh active material is 1, the lithium precursor may be added in an amount for adding lithium at a molar ratio of 0.001 to 0.4. It is proper to add lithium at the molar ratio of 0.01 to 0.2. The addition of the lithium precursor exceeding the lithium lost through washing causes unreacted lithium precursors to be left on the reusable active material, resulting in the increased resistance in the active material reuse process, and accordingly it is necessary to feed the lithium precursor in an optimal amount.

Additionally, the lithium precursor is preferably added in an amount for adding more lithium at the molar ratio of 0.0001 to 0.1 based on a 1:1 molar ratio of lithium:other metal. The addition of excess lithium is for forming a surface protection layer on the active material by surface-coating, and it will be described in more detail below. When secondary batteries are manufactured using the active material, it is possible to suppress the side reactions by the electrolyte solution and maintain the life characteristics.

The annealing may be performed in air at 400 to 1000° C. The annealing temperature may be 600 to 900° C. The temperature is subject to change within the limited range depending on the type of the lithium precursor. The annealing time may be at least 1 hour. Preferably, the annealing time is about 5 hours. When the annealing time is long, the crystal structure may be sufficiently recovered, but the prolonged annealing does not greatly affect the performance. The annealing time is, for example, about 15 hours or less. The annealing equipment may be similar or identical to that of the thermal treatment step S30.

For example, when $Li_2CO_3$ is used as the lithium precursor, the annealing temperature is preferably 700 to 900° C., and more preferably, 710 to 780° C. It is because the melting point of $Li_2CO_3$ is 723° C. Most preferably, the annealing is performed at 750° C. When LiOH is used as the lithium precursor, the annealing temperature is preferably 400 to 600° C., and more preferably, 450 to 480° C. It is because the melting point of LiOH is 462° C.

Preferably, the annealing temperature is higher than the melting point of the lithium precursor. However, at temperatures higher than 1000° C., the thermal decomposition of the positive electrode active material occurs and degrades the performance of the active material, and accordingly the annealing temperature does not exceed 1000° C.

The reusable active material may be obtained through S50.

Optionally, S60 may be performed. In S60, surface-coating is performed on the active material annealed in S50.

The surface-coating step may include coating at least one of a metal, an organic metal or a carbon material on the surface by a solid or liquid phase process and thermally treating at 100 to 1200° C. When thermal treatment is performed at higher temperatures than 1200° C., performance degradation may occur due to the thermal decomposition of the positive electrode active material. In the surface-coating, coating on the surface by a solid or liquid phase process may use mixing, milling, spray drying and grinding.

Through the surface-coating, a surface protection layer of different metals is formed. In case that the molar ratio of lithium:other metal in the positive electrode active material is 1:1, when the molar ratio of lithium:other metal in the positive electrode active material reduces to less than 1:1 by the reaction of lithium in the active material with the surface coating material, it fails to exhibit the capacity 100%. Accordingly, excess lithium is added to compensate for the lithium loss in the previous step S50 so that the molar ratio of lithium:other metal in the positive electrode active material is 1:1, as well as to include more lithium at a molar ratio of 0.0001 to 0.1 to other metal in the positive electrode active material. Accordingly, it is possible to form the surface protection layer such that the molar ratio of lithium:other metal in the positive electrode active material is 1:1 in the surface-coating.

In detail, when the active material is coated with metal oxide such as B, W, B—W and thermally treated, a lithium boron oxide layer may be formed on the active material surface, and this serves as the surface protection layer. The lithium additionally included at the molar ratio of 0.0001 to 0.1 in S50 reacts with metal oxide such as B, W, B—W in S60, and the molar ratio of lithium:other metal in the positive electrode active material does not reduce to less than 1:1, so the capacity does not reduce.

The reusable active material obtained by the above-described method may be represented by Formula 1.

$$Li_aNi_xMn_yCo_zM_wO_{2+\delta}$$ [Formula 1]

where M comprises at least one selected from the group consisting of B, W, Al, Ti and Mg, $1<a\leq1.1$, $0\leq x<0.95$, $0\leq y<0.8$, $0\leq z<1.0$, $0\leq w\leq0.1$, $-0.02\leq\delta\leq0.02$, $x+y+z+w=1$.

The reusable active material may have the F content of 150 ppm or less.

According to the present disclosure, the active material having the reduced F content may be collected, and when reused as active materials, may provide excellent resistance characteristics and capacity characteristics.

According to the present disclosure, LiF or metal fluoride is removed in the washing step of S40. $Co_3O_4$ is removed in S50 of annealing. The step of washing using the lithium compound solution which is basic in an aqueous solution and drying is safe and low-priced, and may remove LiF or metal fluoride without losses of other elements, prevent the dissolution of transition metal, and compensate for the lithium loss occurring during the process. The annealing step is also safe and low-priced and can effectively remove $Co_3O_4$ and recover the crystal structure, i.e., improve the crystallinity, thereby enhancing the battery characteristics of the reusable active material.

The reusable active material obtained according to the present disclosure may have similar particle size distribution to fresh active material, which eliminates the need for separate treatment for particle size distribution adjustment. Since carbon produced by carbonization of the binder or the conductive material does not remain on the surface, there is no need for a carbon removal step. Accordingly, the active material obtained through the method of FIG. 2 may be used to manufacture the positive electrode without any treatment.

The reusable active material may be used 100% without composition adjustment or mixed with fresh active material, and may be used to prepare a slurry in combination with a conductive material, a binder and a solvent.

Hereinafter, the experimental example of the present disclosure will be described in detail.

Experimental Example

Evaluation is performed on positive electrode active materials prepared by the following method.

The experiment is performed largely in three categories. The first one is the analysis of active material elements changing through immersion into basic solution of S25, thermal treatment of S30, and washing and drying of S40, the second one is the detection of element losses for each process in LCO active material having Al surface coating, and the third one is the validation of the effect of the method according to the present disclosure in NCM active material having B—W surface coating.

The following is the experiment of the first category. Table 1 summarizes the element analysis results. ND indicates 30 ppm or less as measured.

TABLE 1

|            | Li/Co ratio | Al         | F          | Na  |
|------------|-------------|------------|------------|-----|
| Sample #1  | 0.98        | 0.30 wt %  | 0.16 wt %  |     |
| Sample #2  | 0.94        | 0.35 wt %  | 0.27 wt %  | ND  |
| Sample #3  | 0.96        | 0.37 wt %  | 0.13 wt %  |     |
| Sample #4  | 0.95        | 0.36 wt %  | 150 ppm    |     |

(Sample #1) Fresh positive electrode active material. LCO positive electrode active material having Al surface coating is selected. The analysis of the fresh LCO positive electrode active material shows the Li/Co ratio of 0.98, 0.30 wt % of Al and 0.15 wt % of F.

(Sample #2) After 96.25 wt % of sample #1, 1.5 wt % of carbon black as the conductive material and 2.25 wt % of PVdF as the binder are metered and mixed with NMP to prepare a slurry, which is used to manufacture the positive electrode, then positive electrode scrap is obtained.

Figure 4:
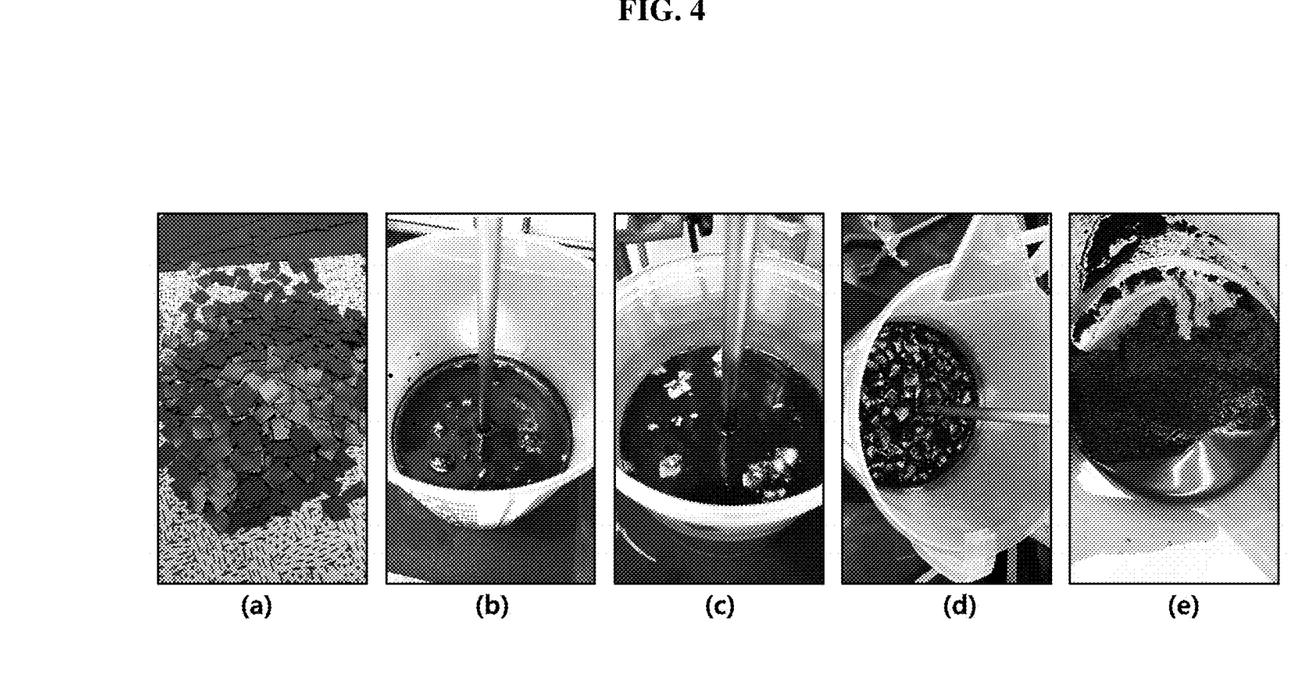
FIG. 4 is a photograph showing a series of steps related to a process of immersing into a basic solution in experimental example of the present disclosure.

FIG. 4 shows a series of steps related to the process of immersion into the basic solution in the experimental example of the present disclosure. As shown in FIG. 4, positive electrode scrap is immersed into 1M NaOH, followed by filtration and washing, to obtain a flake type active material layer. That is, S25 of the method of the present disclosure is performed. In FIG. 4, (a) shows positive electrode scrap broken into pieces, (b) shows that positive electrode scrap broken into pieces is immersed and stirred in 1M NaOH. (c) shows that after further stirring, Al current collector is separated and floats on NaOH. (d) shows that the Al current collector is almost completely separated and floats. (e) shows that part of the active material sinks on the bottom after filtering out NaOH and the Al current collector.

The element analysis result reveals the Li/Co ratio of 0.94, 0.35 wt % of Al and 0.27 wt % of F, and Na is not detected. It is found through the comparison between sample #1 and sample #2 that a ratio of Li to metal reduces through immersion into the basic solution. Additionally, it can be seen that when positive electrode scrap is immersed into high concentration of NaOH, the current collector Al dissolves, but a similar result value to fresh LCO positive electrode active material is obtained through washing. In the case of F, it can be seen that the binder PVdF seldom decomposes in the basic solution and remains. Since positive electrode scrap is immersed into NaOH basic solution, as a result of detecting if any basic element remains, most of Na is removed through filtration and washing after immersion, and is not detected.

(Sample #3) Thermal treatment corresponding to S30 in the method of the present disclosure is performed on the active material layer of sample #2 to collect the active material. The thermal treatment is performed at 800° C. for 5 hours. The element analysis result reveals the Li/Co ratio of 0.96, 0.37 wt % of Al and 0.13 wt % of F. The result shows a reduction in F through thermal treatment.

(Sample #4) Washing and drying corresponding to S40 in the method of the present disclosure are performed on the active material of sample #3. The washing is performed using LiOH for 10 minutes. It can be seen through the comparison between sample #3 and sample #4 that the F content is adjusted to 150 ppm or less through washing using LiOH. It can be seen that washing by S40 is very effective in the F removal.

The next is the experiment of the second category. Table 2 summarizes the element analysis result. ICP analysis is performed on LCO positive electrode active material coated with Al on the surface, to track a change in the amount of a specific element Al.

TABLE 2

|  | Al (wt %) |
|---|---|
| Sample #5 | 0.33 |
| Sample #6 | 0.33 |
| Sample #7 | 0.33 |

(Sample #5) Fresh positive electrode active material. The active material has the Al content of 0.33 wt %.

(Sample #6) After 96.25 wt % of sample #5, 1.5 wt % of carbon black as the conductive material and 2.25 wt % of PVdF as the binder are metered and mixed with NMP to prepare a slurry, which is used to manufacture the positive electrode, then positive electrode scrap is obtained. The positive electrode scrap is immersed into 1M NaOH, followed by filtration and washing, to obtain the active material layer separated from the current collector. Subsequently, thermal treatment is performed at 550° C. for 30 minutes to collect the active material. That is, S25 and S30 in the method of the present disclosure are performed, and the measured Al content is 0.33 wt % and there is no change.

(Sample #7) Washing and drying corresponding to S40 in the method of the present disclosure are performed on the active material of sample #6. The washing is performed using LiOH for 10 minutes. The measured Al content is 0.33 wt % and there is no change.

It can be seen that sample #6 having undergone the thermal treatment has no change in the Al content, and sample #7 further comprising the subsequent process also has no change in the Al content. Al withstands relatively high temperatures, and since the thermal treatment temperature 550° C. is lower than the melting point of Al, Al losses did not occur. According to the present disclosure, although thermal treatment is performed, it is possible to remove LiF or metal fluoride without losses of elements such as Al through temperature control, and prevent the dissolution of transition metal. Accordingly, this experiment shows that when the active material is collected by the method according to the present disclosure, it is possible to obtain the reusable active material without losses of a specific element.

The following is the experiment of the third category.

Example 1: Reusable active material is collected by the active material reuse method of the present disclosure as described above. Waste positive electrode scrap is prepared from NCM-based active material, and S25 is performed by immersing into 1M NaOH. The thermal treatment of S30 is performed at 550° C. for 30 minutes. The washing of S40 is performed for 10 minutes using LiOH. In S50, annealing is performed at 750° C. for 15 hours with an addition of a lithium precursor ($Li_2CO_3$) in an amount for adding more lithium at the molar ratio of 0.09 during the process based on the molar ratio (Inductively Coupled Plasma (ICP) analysis) of lithium and other metal in the raw active material. Theoretically, in the case of fresh active material, the molar ratio of lithium:other metal is 1:1, but since an average error of ICP equipment for measuring the molar ratio is ±0.05, and preferably about ±0.02, the molar ratio of lithium:other metal in the raw active material may be 1±0.05:1 through ICP measurement. In this experiment, the lithium precursor is added based on the analysis ratio through ICP analysis.

Example 2: In addition to example 1, the active material surface protection layer recovery process of S60 is performed.

Comparative example 1: Fresh NCM-based lithium composite transition metal oxide, not reusable active material, is used.

Comparative example 2: Only S25 and S30 in the active material reuse method of the present disclosure as described above are performed to separate the Al current collector, remove the binder and the conductive material, and collect the NCM-based active material. S25 and S30 are performed in the same condition as example 1. The surface modification process of S40, the crystal structure recovery process of S50 and the surface-coating process of S60 in the active material reuse method of the present disclosure are not performed.

Comparative example 3: Further to comparative example 2, the active material is collected by performing the surface modification of S40 of the active material reuse method of the present disclosure. That is, surface modification is performed, but the crystal structure recovery process of S50 and the surface-coating process of S60 in the active material reuse method of the present disclosure are not performed. S40 is performed in the same condition as example 1.

Comparative example 4: Further to comparative example 2, NCM-based active material is collected by performing the crystal structure recovery of S50 of the above-described active material reuse method of the present without the surface modification of S40. Annealing for crystal structure recovery is performed without lithium precursor addition as opposed to example 1.

Comparative example 5: S25, S30, S40 and S50 of the active material reuse method are performed in the same way as example 1. In this instance, annealing for crystal structure recovery is performed without lithium precursor addition as opposed to example 1.

ICP analysis is performed on the positive electrode active material collected or prepared in each of the examples and comparative examples to analyze an amount of remaining LiF, a ratio of lithium and other metal in the active material, and an amount of a specific element such as B or W.

Additionally, the electrochemical performance is evaluated using cells (Coin Half Cell, CHC) manufactured by metering 96.25 wt % of the positive electrode active material collected or prepared in each of the examples and comparative examples, 1.5 wt % of carbon black as the conductive material and 2.25 wt % of PVdF as the binder, mixing with NMP to prepare a slurry and manufacturing the positive electrode.

To determine an amount of LiF remaining in the active material collected in comparative examples 2 and 3, F detection and analysis is performed by ICP. The result is shown in the following Table 3.

TABLE 3

|  | Comparative example 2 | Comparative example 3 |
| --- | --- | --- |
| F content (mg/kg) | 1450 | ND |

ND indicates 30 ppm or less as measured. Referring to Table 3, a significant reduction in the F content in the collected positive electrode active material is found in comparative example 3 compared to comparative example 2. That is, it can be seen that LiF is completely dissolved in the lithium compound solution by washing, and thus removed so completely that it cannot be detected by ICP. Accordingly, it can be seen that LiF removal is performed remarkably well by S40.

To detect any change of lithium in the positive electrode active material during S30 and S40 of the present disclosure, a ratio of lithium/other metal in the active material is analyzed by ICP. The result is shown in the following Table 4.

TABLE 4

|  | Comparative example 1 | Comparative example 2 | Comparative example 3 |
| --- | --- | --- | --- |
| Ratio of lithium and other metal in active material | 0.99 | 0.95 | 0.91 |

Referring to Table 4, it can be seen that comparative example 2 has a reduction in the ratio of lithium/other metal by approximately 0.2 to 0.5 through thermal treatment of S30 compared to comparative example 1, and comparative example 3 has a reduction in the ratio of lithium/other metal by approximately 0.2 to 0.5 through washing and drying of S40 compared to comparative example 2. It seems that NCM-based active material has a large reduction in the ratio of lithium to other metal due to the relatively large specific surface area of particles and transformation to the spinel structure. Accordingly, it can be seen that it is necessary to compensate for the deficient lithium.

Table 4 shows the values measured by ICP analysis, and ICP analysis has an error value of about ±0.02 as mentioned above. Accordingly, in comparative example 1 of fresh active material, the ratio of lithium and other metal may be smaller than 1. Accordingly, an amount of lithium precursor added to compensate for lithium loss is a reduced amount of lithium based on the ratio (the molar ratio analyzed by ICP) of lithium and other metal in the raw active material (i.e., fresh active material) used in the active material layer.

Figure 5:
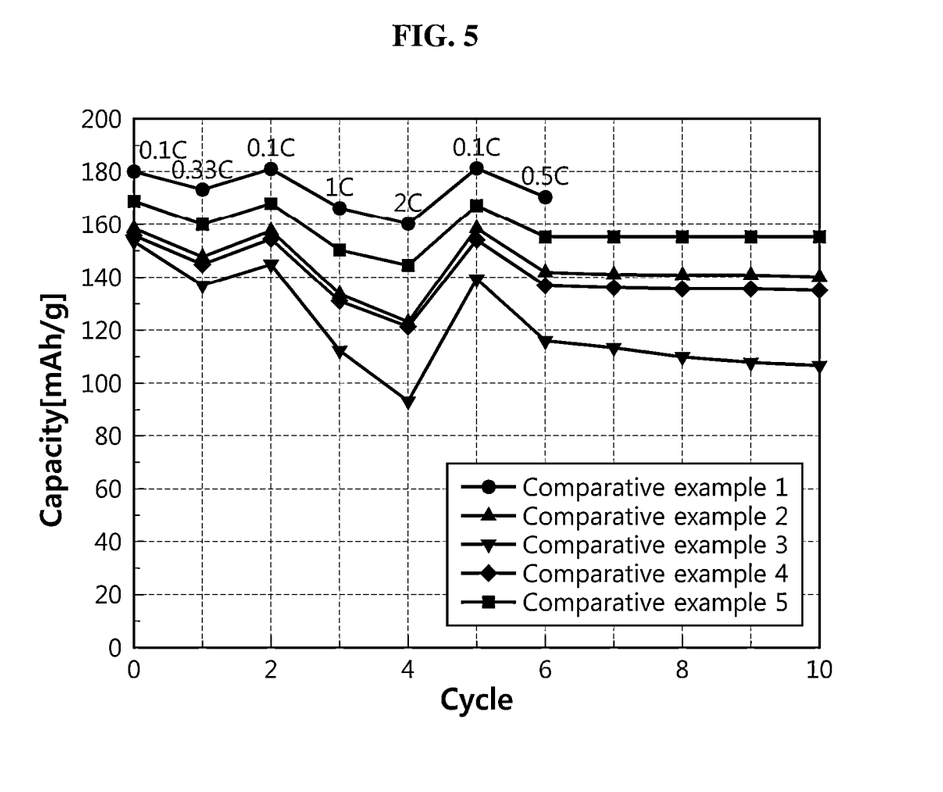
FIGS. 5 and 6 show the results of cell evaluation using active materials of example and comparative examples.
Figure 6:
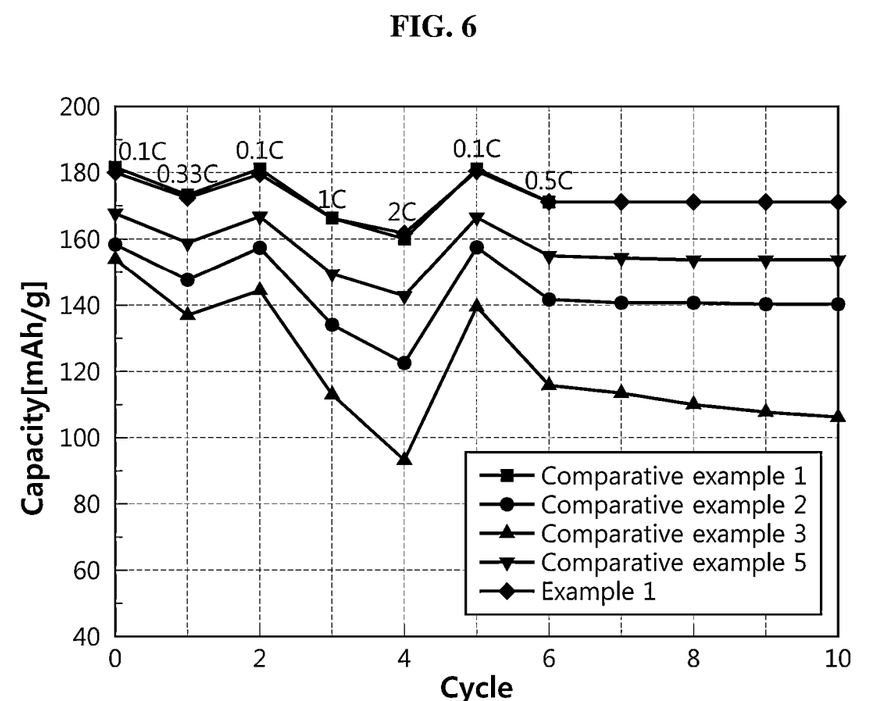

FIGS. 5 and 6 show the results of cell evaluation using the active materials of example and comparative examples. At different currents, the rate performance is evaluated by evaluating the capacity as a function of cycle number. The equipment used for evaluation is a charge/discharge tester commonly used in the lab. There is no difference depending on the measuring device or method. In the graphs of FIGS. 5 and 6, the horizontal axis indicates the cycle number and the vertical axis indicates capacity.

Voltage is 3 to 4.3V, and initial formation charge/discharge is performed at 0.1C/0.1C. The electrolyte solution for the cell is a carbonate based electrolyte solution and includes Ethylene carbonate (EC):Ethyl methyl carbonate (EMC)=3:7 with an addition of additives.

First, referring to FIG. 5, in the case of comparative example 2 before surface modification by S40 and comparative example 3 after surface modification, comparative example 3 having undergone surface modification shows a rapid reduction in electrode capacity. This is because Ni in NCM-based active material transforms into rock-salt by moisture as mentioned above, resulting in capacity reduction.

However, when annealing (750° C./15 hr) is performed without surface modification, this corresponds to comparative example 4, and when compared with comparative example 2, there is little capacity improvement effect. This is due to LiF remaining on the active material surface when surface modification is not performed. As shown above in Table 1, LiF is removed at a satisfactory level by washing.

When surface modification and annealing are performed after primary thermal treatment, the capacity increases as shown in comparative example 5. The reason is that although the capacity reduces after surface modification as shown in comparative example 3, Ni rock-salt is reduced through annealing after removal of LiF by surface modification and its structure is recovered to a hexagonal shape.

Subsequently, referring to FIG. 6, it is found that example 1 has the improved capacity, compared to comparative example 5. Compared to comparative example 5, example 1 involves lithium precursor addition in the annealing. It can be seen that the capacity is improved by compensating for lithium lost in the previous steps by the addition of the lithium precursor. The lithium loss through thermal treatment and washing is described with reference to Table 4.

The lithium compound is added at a ratio of lithium loss to the existing lithium content in the positive electrode active material based on the results of ICP analysis (Table 4), and as a result, the addition at the molar ratio of 0.09 to 0.1 shows the capacity improvement effect at the equivalent level to comparative example 1 as can be seen from the additional experiment.

According to the present disclosure, it is possible to collect the active material from the positive electrode scrap at the directly usable level. It is safe since toxic and explosive solvents such as NMP, DMC, acetone and methanol are not used, and since simple and safe processes such as thermal treatment, washing and drying, and annealing are used, it is suitable for mass production.

Figure 7:
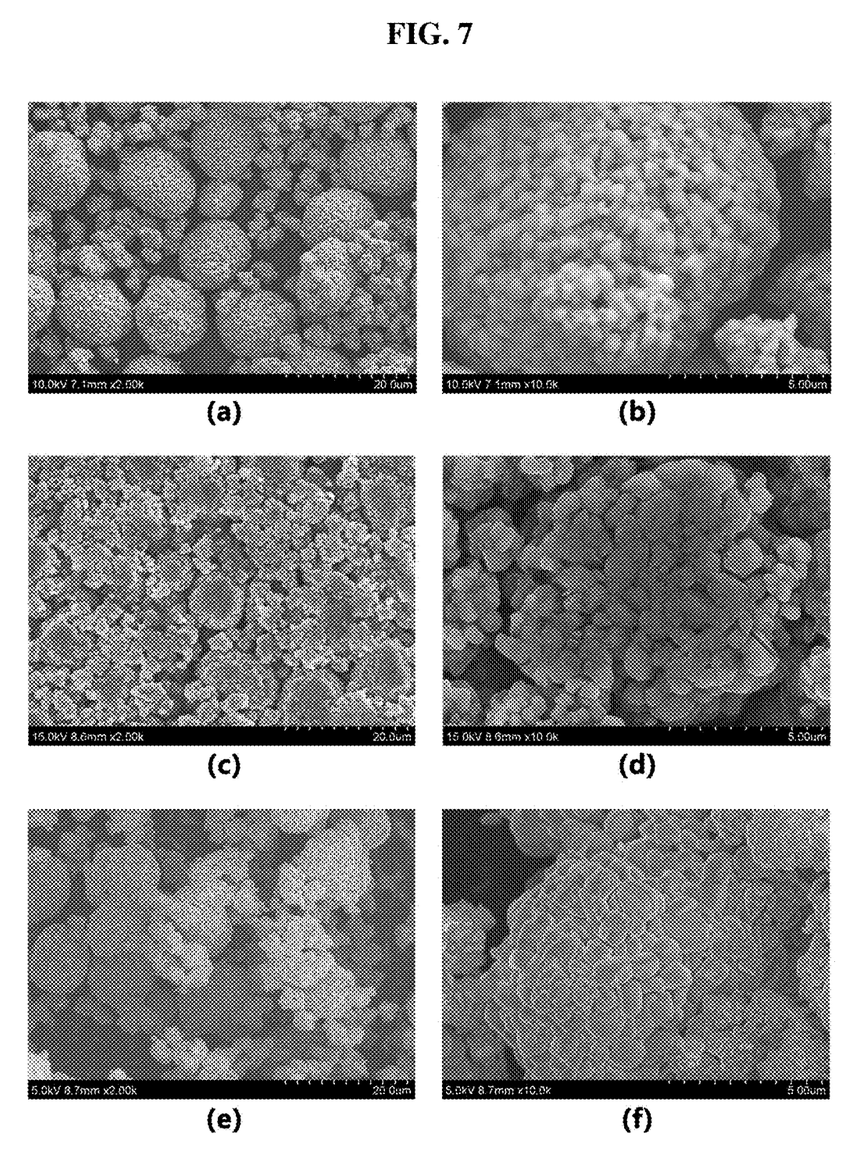
FIGS. 7 and 8 are scanning emission microscope (SEM) images of active materials of example and comparative examples.
Figure 8:
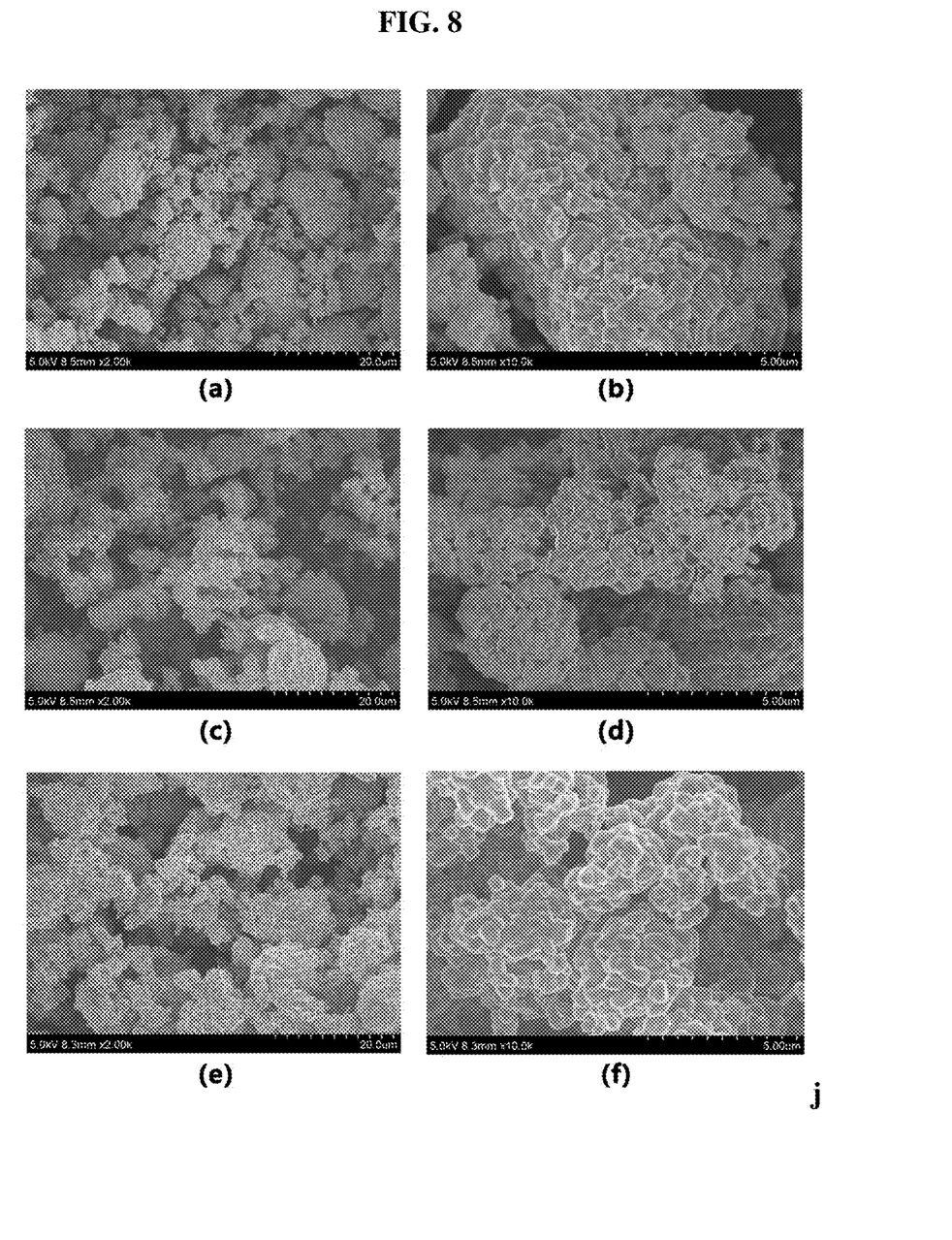

FIGS. 7 and 8 are scanning emission microscope (SEM) images of the active materials of example and comparative examples. The SEM images are captured using SEM equipment commonly used in the lab. For example, imaging may be performed using HITACHI s-4200. However, there is no difference depending on the measuring device or method.

(a) of FIG. 7 is a SEM image of the fresh active material of comparative example 1, and (b) is an enlarged image of (a). (c) shows the surface of positive electrode scrap from fresh active material, and (d) is an enlarged image of (c). The fresh active material has no particle cracking or chipping, but positive electrode scrap from the electrode shows pressed and cracked or chipped particles on the surface by the roll pressing process.

(e) of FIG. 7 is a SEM image of comparative example 2, and (f) is an enlarged image of (e). Referring to (e) and (f), the binder or the conductive material is not observed in the collected active material. That is, it can be seen that the binder or the conductive material is removed during high temperature thermal treatment. Accordingly, it can be seen that the binder or the conductive material is seldom left on the active material surface by thermal treatment in air.

(a) of FIG. 8 is a SEM image of comparative example 3, and (b) is an enlarged image of (a). When comparing (c) and (d) of FIG. 7 showing positive electrode scrap, it can be seen that particles are dispersed through the process.

(c) of FIG. 8 is a SEM image of comparative example 5, and (d) is an enlarged image of (c). (e) is a SEM image of example 1 and (f) is an enlarged image of (e). It can be seen that the particles dispersed in the previous step form agglomerates through annealing. Additionally, when comparing (f) of FIG. 8 with (a) of FIG. 7, it can be seen that the reusable active material of example 1 shows the same shape as fresh active material.

Figure 9:
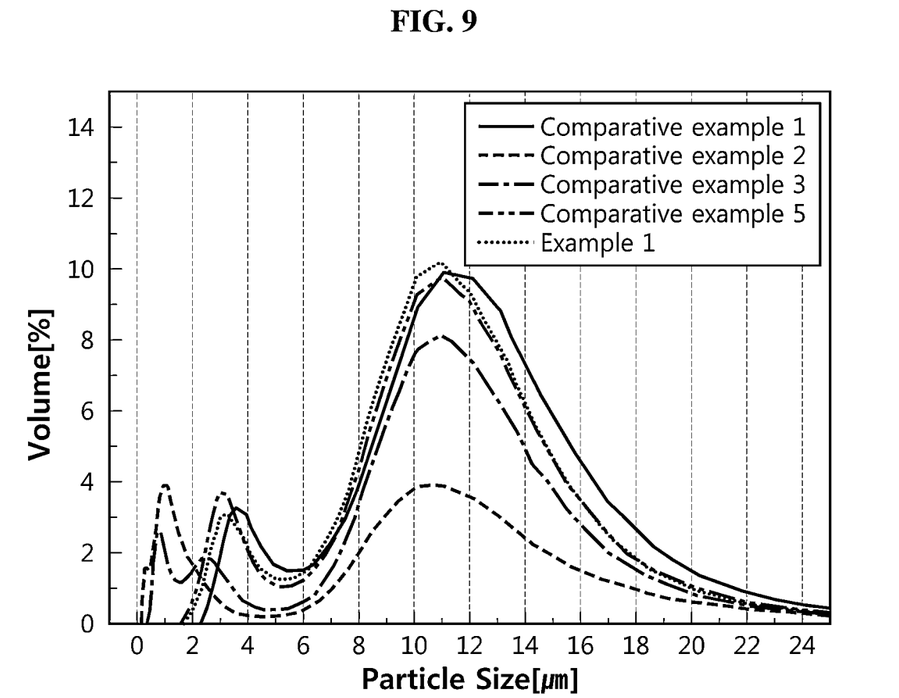
FIG. 9 is a particle size distribution graph of active materials of example and comparative examples.

FIG. 9 is a particle size distribution graph of active materials of example and comparative examples. The particle size distribution may be obtained using a particle size analyzer commonly used in the lab. For example, measurements may be performed using Horiba LA 950V2 particle size analyzer. However, there is no difference depending on the measuring device or method. In FIG. 9, the horizontal axis is particle size (um) and the vertical axis is volume %.

The particle size distribution graph results of FIG. 9 are consistent with the SEM results of FIGS. 7 and 8. Since the NCM-based active material suffers severe particle cracking or chipping by the roll pressing in the electrode formation, a large amount of small particles is observed in the particle size distribution of comparative example 2 after primary thermal treatment, and comparative example 3 after surface modification shows a higher distribution of small particles. However, when annealing is performed, particle agglomeration increases as shown in the previous SEM results, so comparative example 5 or example 1 has similar particle size distribution to comparative example 1 of fresh active material. In particular, the particle size distribution of example 1 is more similar to that of comparative example 1. Volume % of particles having the same particle size with a difference in the range of ±2% is defined as the similar particle size distribution. According to the present disclosure, the particle size distribution of the reusable active material is not different from that of fresh active material and the initial characteristics are almost maintained, and it is expected that the characteristics of batteries including the reusable active materials will be on a similar level to the characteristics of batteries using fresh active materials.

An amount of a specific element is analyzed by performing ICP analysis on the positive electrode active material collected or prepared in each of the example and comparative examples. The result is shown in the following Table 5.

TABLE 5

|  | B content (mg/kg) | W content (mg/kg) |
|---|---|---|
| Comparative example 1 | 500 | 3100 |
| Comparative example 2 | 200 | 2700 |
| Comparative example 3 | ND | 200 |
| Comparative example 5 | ND | 200 |
| Example 1 | ND | 200 |

The fresh active material used in this experiment further includes B and W as seen in comparative example 1. In the case of comparative example 2, it can be seen that the B and W content reduces through thermal treatment, and the remaining results reveal that B is almost completely removed in the subsequent processes. In the case of W, it can be seen that a large amount is removed in the surface modification process through washing as in comparative example 3.

Accordingly, some may be vulnerable to heat and moisture according to the type of the active material initially used, so a specific element may be lost during the process, and in particular, may be completely removed or remain in a small amount in the surface modification process through washing, and in some instances, the characteristics may not be completely recovered by performing the annealing as in example 1. In such a case, it is desirable to perform an additional surface-coating step as proposed. In this experimental example, the surface-coating step includes coating with B and W. The surface-coating may serve as the surface protection layer of the positive electrode active material. The surface-coating may be a process of compensating for a deficient specific element, and at the same time, recovering the surface protection layer in the fresh active material. In the case of the fresh active material used in this experiment, the surface protection layer includes B—W, and lithium loss during the process is interpreted as a ratio of (lithium in the active material itself+lithium for forming the surface protection layer):other metal, not a 1:1 ratio of lithium in the active material itself and other metal. Accordingly, in the above experiment, the molar ratio of 0.09 of the lost lithium in comparative example 3 may be interpreted as the sum of lithium in the positive electrode active material and lithium for forming the surface protection layer, and in the embodiments, the lithium precursor is added in an amount for replenishing lithium.

The surface-coating step goes through a thermal treatment process after solid or liquid phase reaction.

When the reusable active material is represented by the following Formula 1,

[Formula 1]

where M comprises at least one selected from the group consisting of B, W, Al, Ti and Mg, $1 < a \leq 1.1$, $0 \leq x < 0.95$, $0 \leq y < 0.8$, $0 \leq z < 1.0$, $0 \leq w \leq 0.1$, $-0.02 \leq \delta \leq 0.02$, $x+y+z+w=1$, it is thought that M in Formula 1 is replenished through surface-coating.

When the surface coating layer includes B, B—W, B—Ti, B—W—Ti, the surface-coating thermal treatment may be performed at temperatures of 200 to 500° C., and coating may be performed using other metal materials, carbon materials and organic metal materials at temperatures between 100 and 1200° C.

According to the present disclosure, it is possible to reuse positive electrode scrap using a simple, eco-friendly and economical method, and a lithium secondary battery manufactured reusing the prepared NCM-based lithium composite transition metal oxide positive electrode active material does not have a problem with the battery performance.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure and the scope of the appended claims and their equivalents.

What is claimed is:

1. A method for reusing a positive electrode active material, comprising:
   (a-1) immersing a positive electrode scrap comprising an active material layer on a current collector into a basic solution to separate the active material layer from the current collector;
   (a-2) thermally treating the active material layer in air for thermal decomposition of a binder and a conductive material in the active material layer, and collecting an active material in the active material layer;
   (b) washing the active material collected from the step (a-2) with a lithium compound solution which is basic in an aqueous solution and drying; and
   (c) annealing the active material washed from the step (b) with a lithium precursor to obtain a reusable active material.

2. The method according to claim 1, wherein the basic solution comprises LiOH or NaOH.

3. The method according to claim 1, further comprising:
   (d) surface-coating the active material annealed from the step (c).

4. The method according to claim 1, wherein the thermal treatment in the step (a-2) is performed at 300 to 800° C.

5. The method according to claim 1, wherein the lithium compound solution contains a lithium compound in an amount of more than 0% and 15% or less, and the washing is performed within 1 hour.

6. The method according to claim 1, wherein the washing in the step (b) is performed by stirring the active material collected from the step (a-2) at the same time with immersing into the lithium compound solution.

7. The method according to claim 1, wherein the lithium precursor used in the annealing step (c) is one or more selected from the group consisting of LiOH, $Li_2CO_3$, $LiNO_3$ and $Li_2O$.

8. The method according to claim 1, wherein, in the annealing step (c), the lithium precursor is added in an amount that satisfies a ratio of lithium to other metals in a raw active material used in the active material layer.

9. The method according to claim 1, wherein, in the annealing step (c), the lithium precursor is added in an amount corresponding to an amount of lithium at a molar ratio of 0.001 to 0.4 relative to an amount of lithium in a raw active material used in the active material layer.

10. The method according to claim 8, wherein, in the annealing step (c), the lithium precursor is further added in an amount corresponding to an amount of lithium at a molar ratio of 0.0001 to 0.1 relative to an amount of lithium in the raw active material used in the active material layer.

11. The method according to claim 1, wherein the annealing is performed in air at 400 to 1000° C.

12. The method according to claim 1, wherein a temperature of the annealing step exceeds a melting point of the lithium precursor.

13. The method according to claim 1, wherein the active material in the active material layer is collected in a form of powder, and carbon produced by carbonization of the binder or the conductive material does not remain on a surface of the powder.

14. The method according to claim 3, wherein the surface-coating step (d) includes coating at least one of a metal, an organic metal or a carbon material on a surface of the active material annealed from the step (c) by a solid or liquid phase process, and thermally treating at 100 to 1200° C.

15. The method according to claim 1, wherein the reusable active material is represented by the following Formula 1:

$$Li_aNi_xMn_yCo_zM_wO_{2+\delta} \quad \text{[Formula 1]}$$

where M comprises at least one selected from the group consisting of B, W, Al, Ti and Mg, $1 < a \leq 1.1$, $0 \leq x < 0.95$, $0 \leq y < 0.8$, $0 \leq z < 1.0$, $0 \leq w \leq 0.1$, $-0.02 \leq \delta \leq 0.02$, $x+y+z+w=1$.

16. The method according to claim 1, wherein the reusable active material has a fluorine (F) content of 150 ppm or less.

17. The method according to claim 1, wherein the positive electrode scrap comprises a residual electrolyte solution, and the residual electrolyte solution is removed in the step (a-1), and
   wherein the step (a-1) further comprises filtration and washing after the immersion.

18. The method according to claim 1, wherein, in the annealing step (c), the lithium precursor is added in an amount corresponding to an amount of lithium depleted during the steps (a-2) and (b).

* * * * *